Jan. 18, 1955

R. L. HARRIS ET AL 2,699,954

TRACTOR CHASSIS CONSTRUCTION AND INDEPENDENTLY
MOUNTED STEERING WHEELS THEREON

Filed Aug. 12, 1952

INVENTORS
ROBERT L. HARRIS
MARCUS LOTHROP
BY

ATTORNEY

INVENTORS
ROBERT L. HARRIS
MARCUS LOTHROP
BY
ATTORNEY

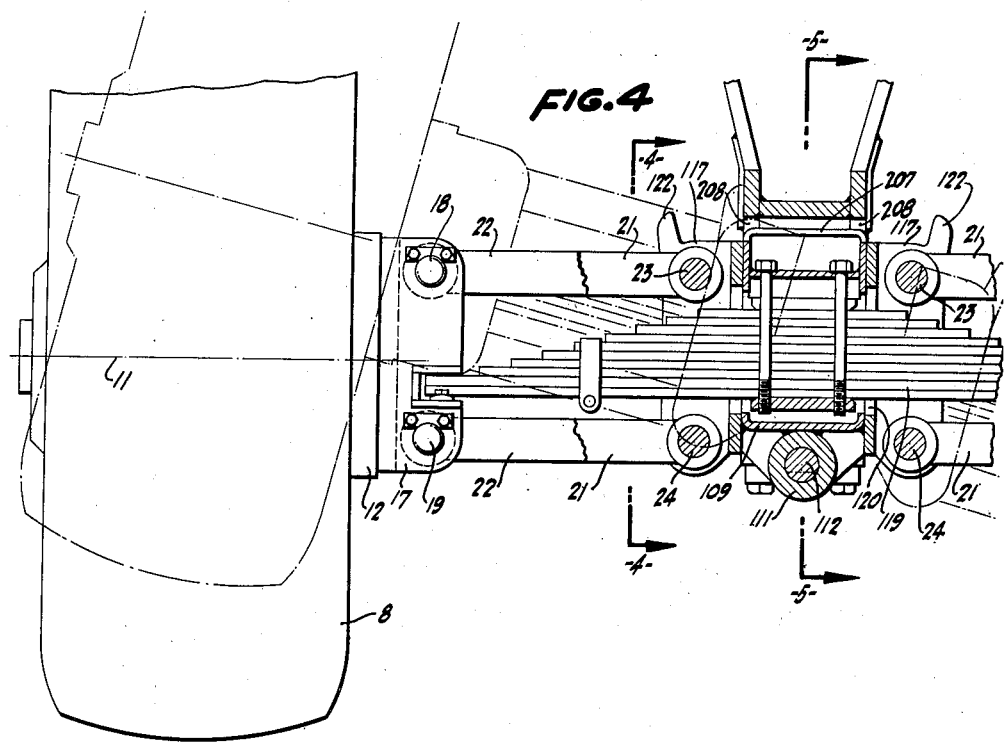
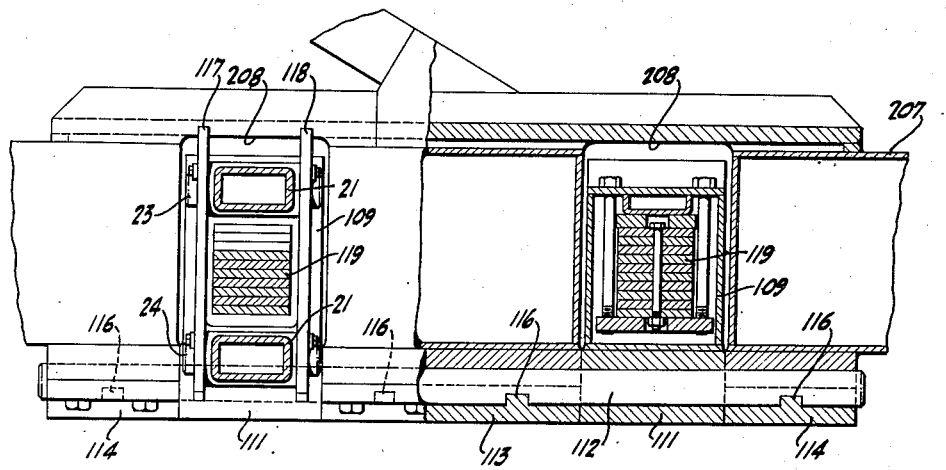

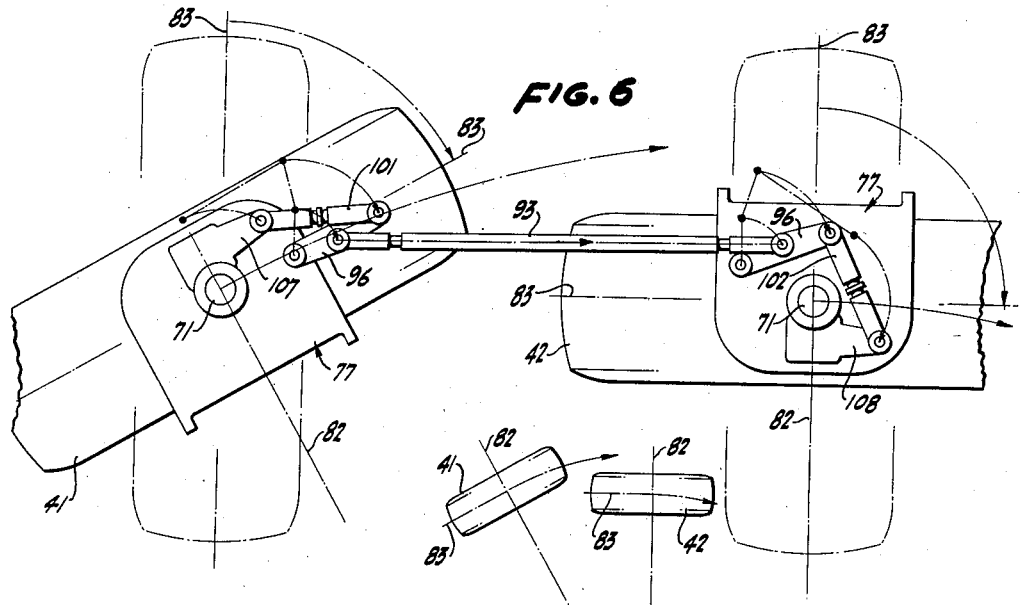
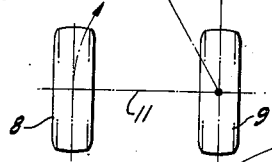
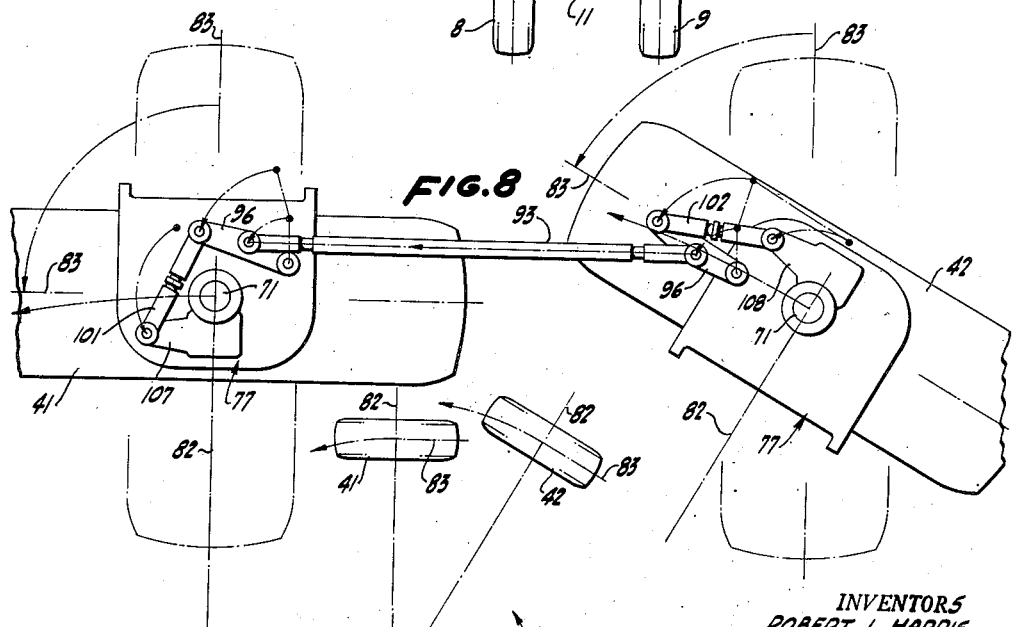
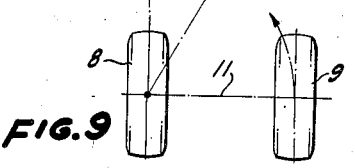

United States Patent Office 2,699,954
Patented Jan. 18, 1955

2,699,954

TRACTOR CHASSIS CONSTRUCTION AND INDEPENDENTLY MOUNTED STEERING WHEELS THEREON

Robert L. Harris and Marcus Lothrop, Berkeley, Calif., assignors to Yuba Manufacturing Company, a corporation Application August 12, 1952, Serial No. 303,962

6 Claims. (Cl. 280—95)

The invention relates to the frame and supporting structure of a rubber tired tractor particularly designed for propulsion by a steam power plant of the sort shown in our Patent Number 2,596,968 issued May 20, 1952, although the chassis construction is suitable for use with other propulsion mechanism.

In general it is an object of the invention to provide a tractor chassis construction especially designed for utilization in a four wheeled rubber tired tractor capable of operation over very rough terrain and capable of maneuvering in a small space, the tractor being designed to steer at approximately 90 degrees either way from center so as to turn about either one of its rear wheels as a center.

Another object of the invention is to provide a flexible suspension mechanism in the chassis construction so that all of the four wheels will bear loads substantially equally even though the supporting surface is very rough.

Another object of the invention is to provide a chassis construction in which the wheels are individually movable within limits to accommodate local irregularities.

A still further object of the invention is to provide a steering mechanism effective to operate the wheels throughout a wide steering angle.

A still further object of the invention is to arrange a chassis construction so that the frame, although strong, is not in the way of the steering of the wheels or of the relative motion of other parts.

Other objects, together with the foregoing, are attained in the embodiments of the invention described in the accompanying description and illustrated in the accompanyign drawings in which Figure 1 is a plan of a tractor chassis construction in accordance with the invention, certain portions being omitted or broken away to reduce the size of the figure and to disclose the construction more clearly.

Figure 4 is a cross section of a modified form of rear wheel suspension, the view being generally comparable to Figure 3.

Figure 5 is a cross section, the plane of the left hand half being indicated by the line 4—4 of Figure 4, and the plane of the right hand half being indicated by the line 5—5 of Figure 4.

Figure 6 is a schematic plan showing the front wheels and associated steering mechanism of the tractor chassis construction with the wheels in their extreme right turn position indicated in full lines and in their straight ahead position indicated in dotted lines.

Figure 7 is a diagram illustrating the relationship of the front wheels and the rear wheels when the front wheels are in the full line position of Figure 6.

Figure 8 is a plan comparable to Figure 6 but showing the wheels in their extreme left turn position.

Figure 9 is a diagram comparable to Figure 7 but showing the front wheels in their extreme left turn position relative to the rear wheels.

While the tractor chassis construction of our invention is susceptible to numerous variations depending on the particular service to be met and depending upon the type of power plant employed and other comparable factors, it has successfully been manufactured as illustrated herein.

In this arrangement, there is preferably provided a main frame 6 made up of a plurality of shapes such as plates, channels and angles. The main frame incorporates a central frame beam 7 of box cross section extending substantially for the full length of the tractor in a longitudinal direction and located on the longitudinal midline of the frame at a convenient height from the ground to constitute a sort of back bone.

Figure 1:
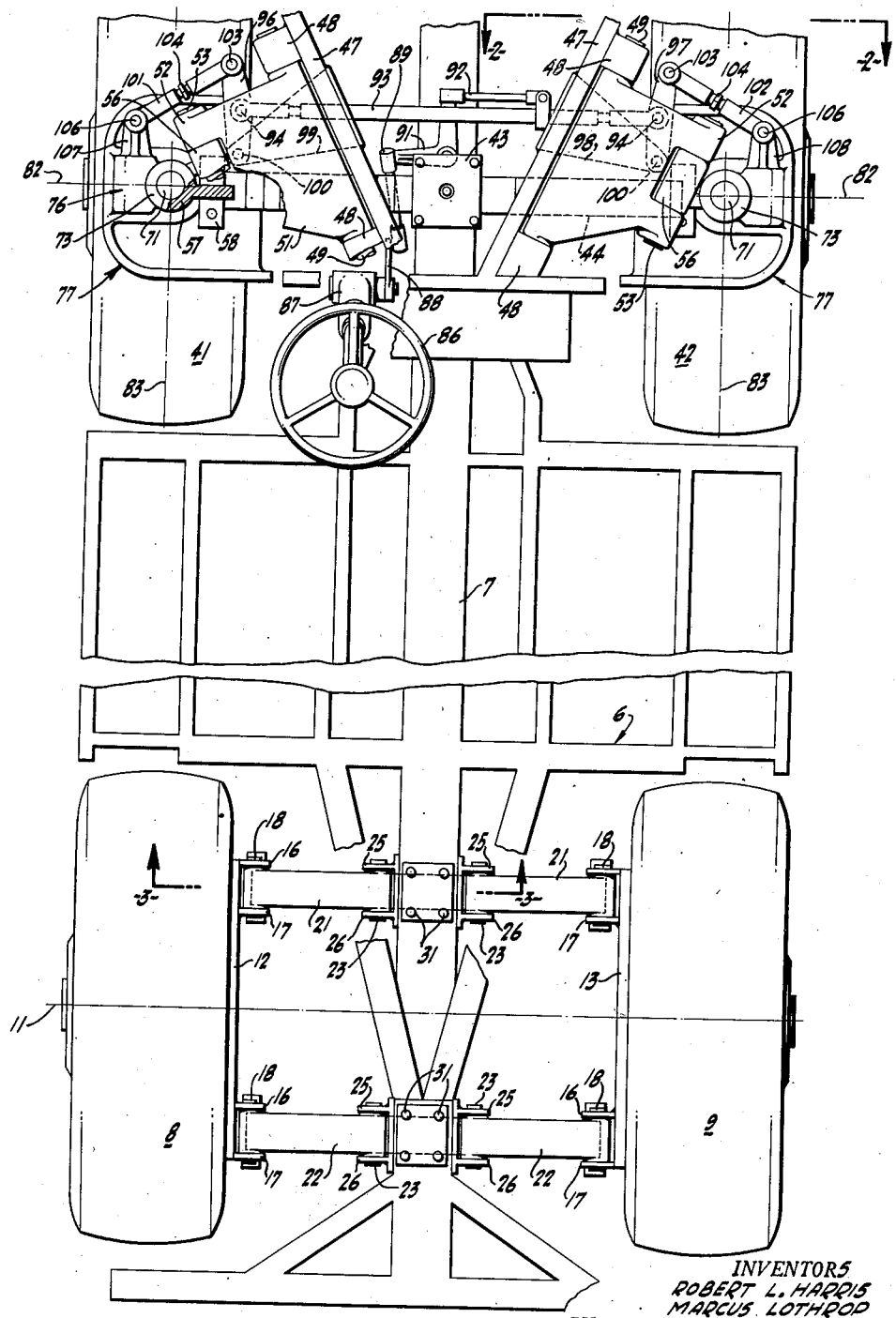
Figure 3:
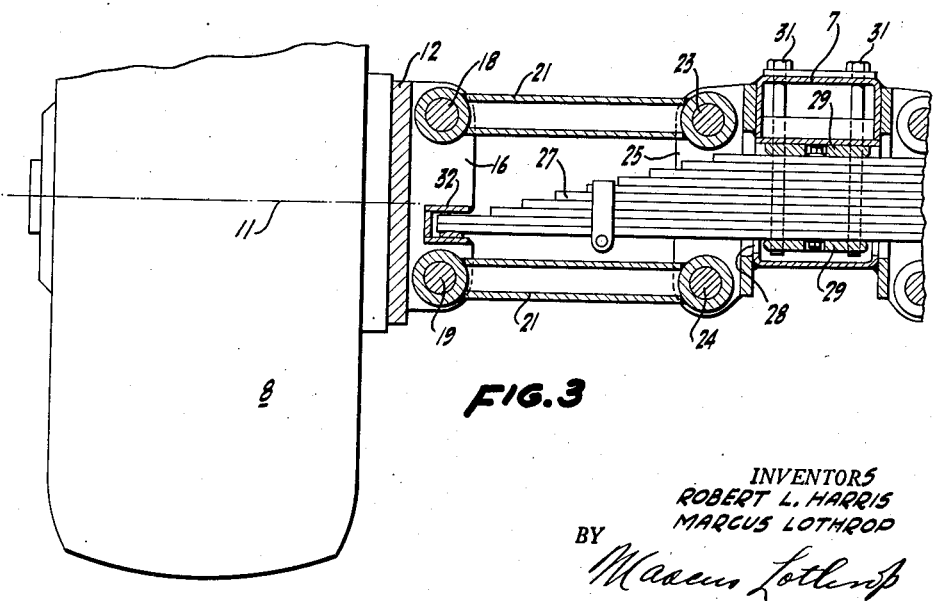
Figure 3 is a cross section, the plane of which is indicated by the line 3—3 of Figure 1.

Toward the rear of the frame 6, especially as shown in Figure 3, the main beam 7 is provided at each side with symmetrically disposed arrangements for mounting a left rear wheel 8 and a right rear wheel 9 on the structure. The ground engaging wheels 8 and 9 are arranged with their rotational axes normally coincident as indicated by the line 11 in Figure 1. While the wheels rise and fall in actual operation, it is considered for purposes of description that they are on a level surface so that their rotational axes are actually one and the same. The wheels are provided with appropriate axle tubes, not shown, mounted on rear wheel supporting plates 12 and 13.

Since the structure on both sides of the central frame beam is identical, the description of one side applies equally to the other. Each of the rear wheel supporting plates is provided with parallel flange mounts 16 and 17 through which upper and lower mounting bolts 18 and 19 are passed. The mounting bolts pass also through the outboard end of upper and lower forward support arms 21 and upper and lower rearward support arms 22. The inner ends of the arms are similarly mounted on upper and lower pins 23 and 24 passed through flanges 25 and 26 suitably secured at intervals along the length of the frame beam 7.

All of the rear support arms 21 and 22 are parallel, of the same length and are secured with their axes parallel. The rear supporting plates 12 and 13 rise and fall with respect to the beam 7 with the general planes of the plates always parallel to themselves so that the ground engaging wheels 8 and 9 also rise and fall with respect to the frame always parallel to themselves. The rising and falling motion of the wheels with respect to the frame causes them to approach and recede from the frame in a transverse direction as they move in their arcuate paths. This changes the transverse measurement of the tread of the tractor slightly and has some effect upon the steering of the vehicle although usually the amount of this variation is so minor as to be neglected.

In order to transmit load from the frame 6 to the ground engaging wheels and similarly to cause the frame to follow the ground, the support is inclusive of a pair of identical transverse rear springs, the forward one of which 27 is illustrated in Figure 3 and the rearward one of which is associated with the support arms 22. The springs pass entirely through apertures 28 in the beam 7 and are anchored in position between pads 29 by spring bolts 31. The outboard ends of the springs extend between sockets formed by ledges 32 extending between the flanges 16 and 17. The extent of motion of the wheels is in accordance with the pattern imposed by the springs 27. With this arrangement there is afforded what amounts to an individual wheel suspension for each of the rear wheels, the load however being cushioned by means of the springs and the torque loads both for driving and for braking being taken care of by the support arms 21 and 22.

The frame 6 in its forward portion is also provided with connections to front ground engaging wheels 41 and 42. For this reason there is provided, as a part of the frame work and upstanding from the longitudinal beam 7, a vertical mast 43 comprised of structural members rising enough above the general level of the central beam 7 to serve as a seat for a front transverse spring 44. This is held in position centrally by spring bolts 46 and extends transversely either side of the main beam. Also, the frame 6 is inclusive of various channels and shapes constituting a somewhat triangular superstructure 47 diverging from behind the mast 43 and increasing in transverse dimension as it extends forward.

Fastened to the superstructure are supporting arrangements which are substantially identical on opposite sides of the central portion of the tractor so that a description of one applies equally to the other. The superstructure 47 is provided with a pair of upper bosses 48 mounting an upper inboard hinge pin 49. An upper front support arm 51 is engaged with the hinge pin 49 for rising and falling movement with respect to the superstructure 47. At its outboard end, the support arm 51 is bifurcated to provide hubs 52 receiving an upper outboard hinge pin 53 parallel to the hinge pin 49.

Figure 2:
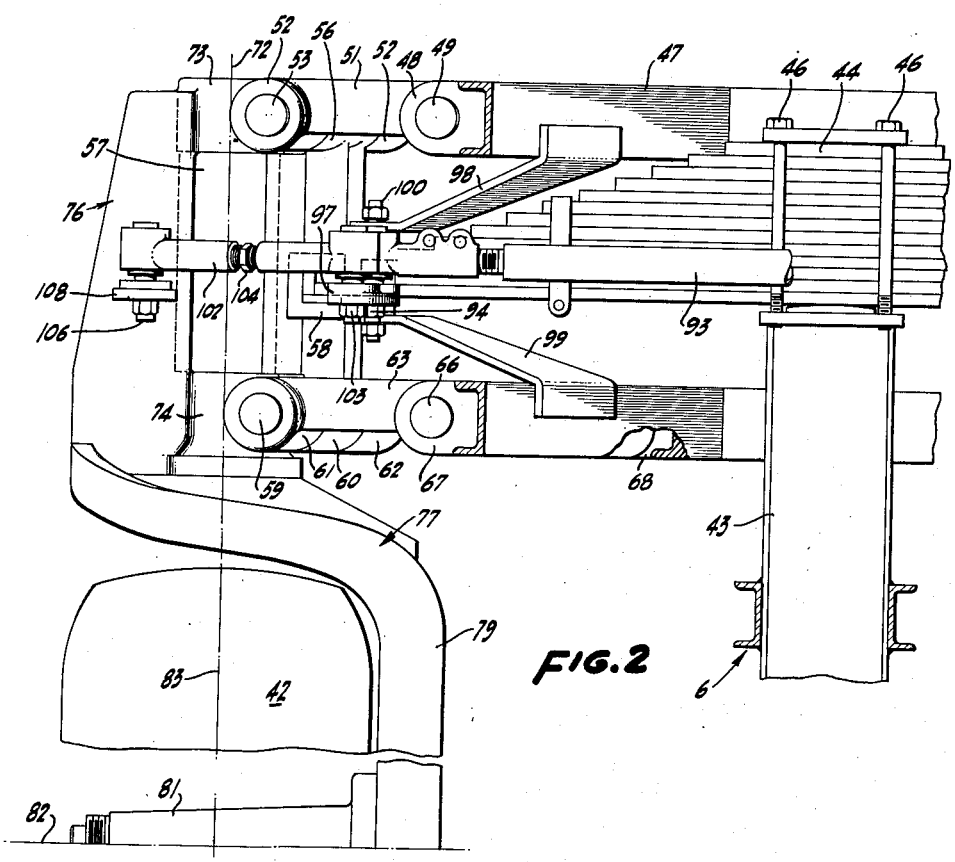
Figure 2 is a cross section, the plane of which is indicated by the line 2—2 of Figure 1.

Engaging the upper outboard hinge pin 53 is a horizontal sleeve 56 forming part of a boss 57 extending generally vertically. The boss 57 is appropriately reinforced and is provided with a pocket 58 to receive the outboard end of the transversely extending supporting spring 44. The boss also is provided with a lower horizontal sleeve 60 engaging a lower outboard hinge pin 59 parallel to the hinge pin 53. The pin 59 is received in outside bosses 61 and 62 (Figure 2) of a lower support arm 63. The inboard end of the lower support arm 63 is formed with an inboard sleeve in which a lower inboard hinge pin 66 is disposed parallel to the pin 49. A pair of bosses 67 and 68 mounted on the superstructure 47 of the frame work 6 serve as a lower mounting for the support structure. Loads are thus transmitted back and forth between the main frame 6 and the boss 57.

Since the axes of all of the hinge pins are parallel and since the upper support arm and the lower support arm are of the same length, the boss 57 is mounted for rising and falling movement relative to the main frame. The boss remains always parallel to itself and travels in an arcuate path approaching and receding from the main frame central plane. This produces some errors in the steering geometry but these errors are normally so small as to be neglected.

Passing through the boss 57 is a steering spindle 71, preferably constituted of a pin arranged with its central axis 72 in a vertical direction. On the upper and lower extremities of the spindle 71 there are mounted hubs 73 and 74 included in a yoke 76 itself a part of a front wheel bracket 77. The yoke 76 is preferably a box-like member disposed eccentrically of the spindle 71, preferably on the side of the spindle away from the central frame beam 7. The hubs 73 and 74 are integrally formed with the rest of the yoke 76 and turn with respect to the boss 57 about the axis 72 as a center. The angular turning motion is relatively great but there is sufficient clearance between the parts so that they do not come into contact except at the very extremes of the relative rotational movement between the yoke and the surrounding structure.

The front wheel bracket 77 is fabricated of metal plates adequately reinforced with flanges 79. At an appropriate elevation from the ground it carries an axle tube 81 affording a transverse rotational axis 82 for the front ground engaging wheel 42. The axis 82 is so disposed that it intersects the steering axis 72. Furthermore, the axle tube 81 is so located that the front ground engaging wheel 42 is disposed with its central plane (indicated by the line 83 in Figure 2) in a position to contain the axis 72. The central plane of the front wheel referred to is the vertical plane which, transversely of the vehicle, is substantially midway between the sides of the tire or wheel 42.

While the exact coincidence and intersection of the various planes and axes is an ideal situation, there is in practice some variation from precise intersection and coincidence but the relationship of the parts is not materially varied from the ideal. The wheel 42 is nested within the front wheel bracket 77 for some of its periphery and is so disposed that the steering spindle 71 is located immediately above it. The distance between the steering axis 72 and the mast 43, the superstructure 47 and the frame beam 7 is such that it is possible for the front wheel bracket 77 and the wheel 42 to turn throughout most of a circle without encountering any mechanical interference.

Thus, the wheel 41 is mounted and supported so that it can rise and fall to accommodate the irregularities in the terrain and can assume load from the tractor frame through the connecting arms and the spring mechanism and still can steer through wide angles for maneuverability of the vehicle.

In order to accomplish the desired steering motion, there is provided at a convenient station on the main frame 6 an operator controlled steering wheel 86 preferably provided with a power assist mechanism, not shown. The steering wheel 86 operates through the customary worm mechanism 87 to move a drop arm 88. This is connected by a primary drag link 89 disposed longitudinally of the vehicle to a bell crank 91 mounted on the mast 43. A secondary drag link 92 is connected to the bell crank and is clamped to a tie rod 93 disposed transversely of the vehicle substantially parallel to the spring 44. The outboard ends of the tie rod 93 are connected by suitable articulations such as pivot pins 94 to steering arms 96 and 97 symmetrically disposed at the opposite sides of the vehicle.

The mountings for the steering arms 96 and 97 are similar so that a description of one applies to the other. As particularly illustrated in Figure 2, the superstructure 47 includes brackets 98 and 99 carrying a fulcrum pin 100 arranged with its axis substantially vertical and serving as a mounting for an associated steering arm. The forwardly extending, free ends of the steering arms 96 and 97 are connected to steering links 101 and 102 by articulations 103 such as ball joints. Each of the links preferably has an adjustment 104 therein. Appropriate articulations 106 at the opposite ends of the steering links 101 join them to steering connectors 107 and 108 extending forwardly from the main body of the yokes 76.

Since the steering arms 96 and 97 amount to levers affording an increase of about 2 to 1 in travel and since the location of the articulations 103 and 106 is such that the links 101 and 102 in effect travel around their respective axes 72, it is possible with a standard amount of movement of the tie rod 93 to increase the amount and arrange the direction of the link movement so that the wheels 41 and 42 steer through greatly augmented steering angles.

As particularly illustrated in Figures 6 to 9 inclusive, the steering arrangement and the front wheel bracket construction are such that upon appropriate manipulation of the steering wheel 86 the right hand wheel 42 turns about its axis 72 to the right through a full 90 degrees. The rotational axis 82 of that wheel is then parallel to the longitudinal axis of the vehicle and is contained by the transversely central vertical plane of the rear wheel 9. During this motion of the right front wheel, the left front wheel 41 is turned through a lesser but suitable angle so that the rotational axis 82 of that wheel also intersects the rotational axis 11 of the rear wheel 9 at the transversely central vertical plane of the rear wheel. The effect of this amount of steering is to constitute the central ground engaging part of the right rear wheel 9 a sort of pivot center for the entire vehicle, the other wheels being appropriately disposed with their rotational planes perpendicular to such a pivot point as illustrated in Figure 7. When the vehicle makes a maximum turn to the right, the radius of turning of the right front wheel is equivalent to the wheel base of the vehicle.

In a comparable fashion, as illustrated particularly in Figures 8 and 9, movement of the steering wheel 86 from straight ahead position to an extreme left hand position rotates the left front wheel 41 a full 90 degrees to the left and rotates the right front wheel 42 through an appropriate lesser angle so that the central ground engaging portion of left rear wheel 8 then serves as a pivot for the entire vehicle, the other wheels having their planes of rotation perpendicular to this pivot center. Maximum left hand turn is also made at a turning radius equal to the wheel base of the vehicle. In this way, the tractor is steered either to the right or to the left with the appropriate front wheel making a full right angle turn, as illustrated, so that the maneuverability is good.

In some instances and particularly at light load operation over extremely rough terrain, it is found that springs 27 designed for use under heavy loads are too stiff to make all of the wheels remain in firm driving contact with the ground. There is sometimes a tendency for one of the wheels to be lifted by the springs. It is desirable to retain the spring stiffness, yet to insure adequate ground contact. For this purpose we provide the structure shown in Figures 4 and 5 as a replacement for the rear wheel mounting structure shown in Figures 1 and 3.

The main frame beam 207 has a pair of transverse openings 208 in each of which a spring mounting box 109 is disposed. Each of the boxes is integral with a depending hub 111 receiving a mounting pin 112 extending longitudinally beneath the beam 207. The pin 112 is supported at intervals by split mounting blocks 113 and 114. The caps of the mounting blocks are provided with keys 116 extending into suitable notches cut in the pin 112 so that longitudinal displacement is prevented and so that the tendency of the boxes 113 and 114 to spread apart under load is in part resisted by the pin. The spring boxes 109 oscillate freely about the longitudinal axis of the pin 112 as a center.

On either side of the spring mounting boxes 109, flange plates 117 and 118 are fastened to carry pivot pins 23 and 24 exactly as previously described. Extending through an appropriate opening 120 in the spring box 109 is a transverse spring 119 preferably the same as the spring 27. The support arms 21 and 22 are identical with those previously described. The arrangement shown in Figures 4 and 5 is an adaption permitting the useage of most all of the components previously described, and permitting the rear mounting to partake of extra freedom of movement. As illustrated in Figure 4, the left rear wheel 8, for example, can rise through a substantial interval without any spring deflection whatsoever. Stops 122 are provided to preclude excessive lateral movement or instability.

What is claimed is:

1. A tractor chassis construction comprising a frame, a boss disposed to one side of said frame, support arms articulated to said frame and to said boss, spring means for imposing frame loads upon said boss, a ground engaging wheel disposed directly under said boss, a wheel bracket, an axle on said bracket and mounting said wheel for ground rotation, a steering yoke on said bracket in load carrying relation to said boss, a spindle engaging said yoke and said boss for mounting said wheel for steering rotation about a vertical axis in the transversely central vertical plane of said wheel, a steering arm on said frame, a steering connector on said yoke, a steering link, articulations between said steering link and said steering arm and between said steering link and said steering connector, and means for operating said steering arm.

2. A tractor chassis construction comprising a frame, a boss disposed to one side of said frame, means for supporting said boss on said frame for rising and falling movement relative thereto, a wheel bracket, an axle on said wheel bracket, a ground engaging wheel mounted for rotation on said axle, a yoke on said wheel bracket engaging said boss, a steering spindle engaging said boss and said yoke and disposed above said wheel with the axis of said spindle in the transversely central vertical plane of said wheel, a steering arm on said frame, a steering connector on said yoke, and a steering link accommodating rising and falling movement of said yoke and interconnecting said steering arm and said steering connector.

3. A tractor chassis construction comprising a pair of ground engaging wheels, bosses disposed above said ground engaging wheels, wheel brackets supporting said ground engaging wheels, yokes on said wheel brackets engaging said bosses for steering rotation of said ground engaging wheels relative to said bosses about vertical axes located in the transversely central vertical planes of said ground engaging wheels, means for preventing displacement of said bosses relative to said yokes along said axes, a superstructure, articulated support arms connected to said superstructure and to said bosses, a frame beam extending between said ground engaging wheels, means for connecting said superstructure and said frame beam, and means for steering said front ground engaging wheels into position substantially at a right angle to said frame beam.

4. A tractor chassis construction comprising a frame, a boss disposed to one side of said frame, means for supporting said boss on said frame for rising and falling movement relative thereto, a spindle disposed in said boss with the spindle axis vertical, a ground engaging wheel disposed beneath said spindle with the transversely central plane of said wheel containing the axis of said spindle, an axle rotatably mounting said wheel, a wheel bracket secured to said axle between said wheel and said frame, a yoke straddling said boss on the side thereof remote from said frame and engaging said spindle, said yoke and said wheel bracket being united, and means on said frame and engaging said yoke for turning said yoke about the axis of said spindle relative to said frame.

5. A tractor chassis construction for use with a frame and rear ground engaging wheels mounted on said frame for rotation about substantially horizontal transverse axes, comprising a pair of front bosses disposed on opposite sides of said frame, support arms articulated about substantially longitudinal axes spaced apart transversely on said front bosses and said frame for connecting said bosses to said frame for rising and falling movement relative thereto, front ground engaging wheels, front wheel brackets mounting said front wheels for rotation about substantially horizontal axes, means above said front wheels interconnecting said front wheel brackets and said bosses for steering rotation about substantially vertical axes substantially in the transversely central planes of said front wheels, a pair of horizontal steering arms pivoted on said frame, a tie rod articulated to said steering arms, steering connectors on said front wheel brackets, steering links substantially in the same plane as said tie rod, articulations between said steering connectors and said steering links and between said steering arms and said steering links, each of said links between said articulations having a space about equal to the space between said longitudinal axes and means on said frame for operating said tie rod to turn said front wheel brackets between two extreme positions in which the rotational axis of one or the other of said front wheels is substantially perpendicular to the rotational axis of the rear wheel on the same side of said frame.

6. A tractor chassis construction comprising a frame, a boss, means for mounting said boss on said frame with the axis of said boss vertical, said mounting means including support arms articulated to said frame and to said boss, a yoke extending around said boss on one side of said axis and having portions lying above and below said boss and abutting said boss to preclude movement of said portions relative to said boss along said vertical axis, a spindle engaging said portions and said boss, a wheel bracket united to and depending from said yoke on the other side of said axis, an axle mounted on said wheel bracket with the axis of said axle intersecting the axis of said boss, a wheel mounted on said axle with the central plane of said wheel containing the axis of said boss, and means for turning said yoke with respect to said boss.

References Cited in the file of this patent

UNITED STATES PATENTS

| Number | Name | Date |
|---|---|---|
| 1,633,151 | Winsor | June 21, 1927 |
| 1,886,963 | Lundelius et al. | Nov. 8, 1932 |
| 2,099,304 | Kepler | Nov. 16, 1937 |
| 2,157,773 | Probst | May 9, 1939 |
| 2,191,961 | Howell | Feb. 27, 1940 |
| 2,209,804 | Ashley | July 30, 1940 |
| 2,228,454 | Hamilton | Jan. 14, 1941 |
| 2,309,811 | Utz | Feb. 2, 1943 |
| 2,420,462 | Carr | May 13, 1947 |
| 2,609,216 | McElhinney et al. | Sept. 2, 1952 |